Feb. 21, 1933.                J. MAZER                1,898,586
                           RING CONTRACTOR
                        Filed Sept. 21, 1929
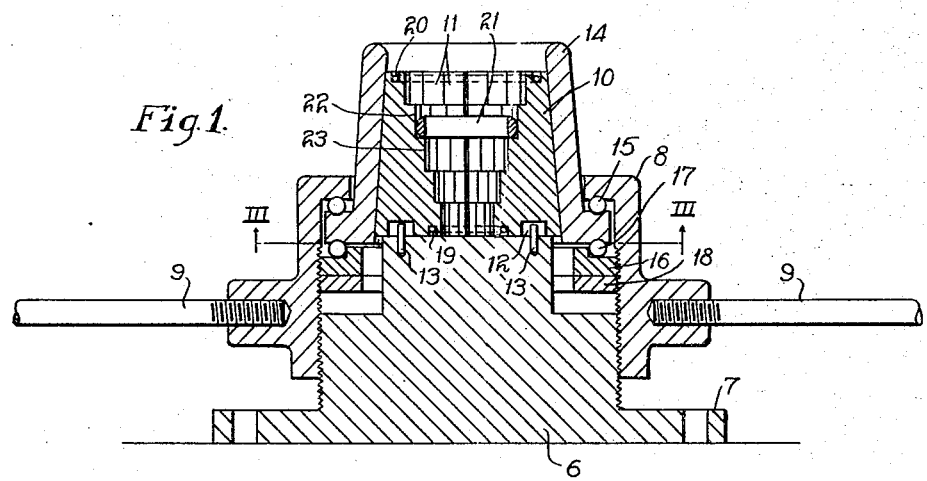
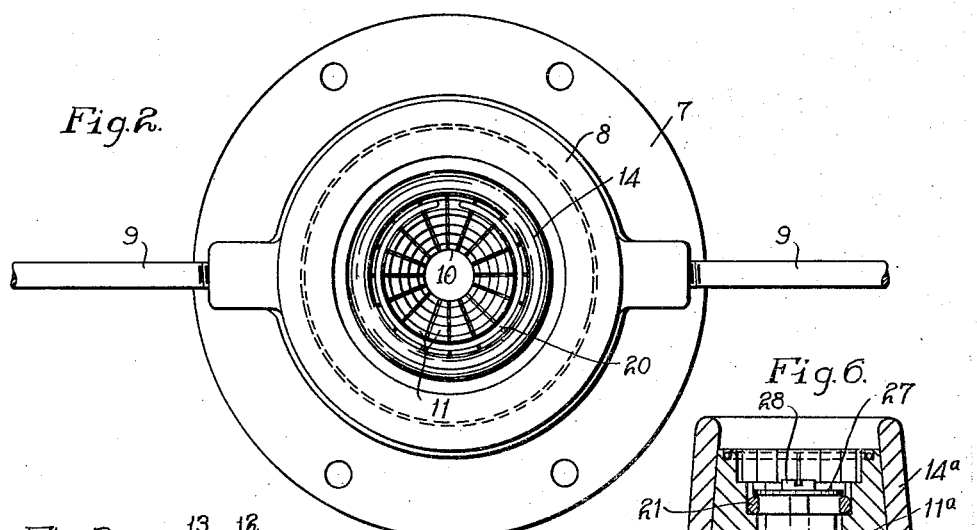
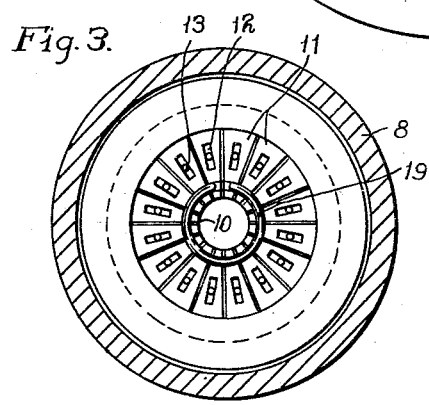
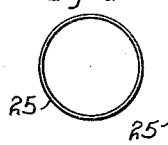
INVENTOR
Joseph Mazer
By Archworth Martin,
Attorney.

Patented Feb. 21, 1933

1,898,586

UNITED STATES PATENT OFFICE

JOSEPH MAZER, OF NEW YORK, N. Y.

RING CONTRACTOR

Application filed September 21, 1929. Serial No. 394,347.

My invention relates to ring contractors, and more particularly to apparatus for reducing the diameters of finger rings or similarly-shaped articles.

One object of my invention is to provide a ring contractor of simple form which is effective in operation and which will reduce or compress a ring to a smaller diameter without marring the same.

Another object of my invention is to provide a contractor capable of accurately reducing ring diameters to any desired extent.

One form which my invention may take is shown in the accompanying drawing, wherein Figure 1 is a vertical sectional view of a ring contractor; Fig. 2 is a plan view thereof; Fig. 3 is a view taken on the line III—III of Fig. 1; Figs. 4 and 5 are views of liners which may be employed within the compressing die of the apparatus, and Fig. 6 shows a modification of a portion of the apparatus of Fig. 1.

The apparatus is provided with a metal base or block 6 that has a flange 7 by means of which it may be rigidly secured to a suitable support (not shown). The body portion of the base 6 is screw-threaded for the reception of a threaded collar 8, the collar being provided with operating handles 9, by means of which it may be rotated.

The base 6 has a central upstanding portion that serves as a seat for a hollow compressing or shrinking die 10 that is composed of segments 11 which are interiorly stepped as shown more clearly in Fig. 1.

Each of the segments 11 is provided with a radially extending slot 12 in its underside into which extends a pin 13 that is mounted in the base 6. These pins and slots serve to direct movement of the segments 11 along definite radial lines, so that the spaces between the various segments will all be uniform at any given radial position of said segments.

The exterior of the die 10 is of generally circular form and tapers upwardly. A sleeve 14 that is correspondingly tapered surrounds the die 10 and is provided with a horizontally-extending flange at its lower end which serves as a ball race or may serve as a support for a ball race. The upper end of the sleeve 8 has an inwardly-extending flange which overlies the flange of the sleeve 14, and balls 15 are interposed between these flanges to serve as an anti-friction thrust bearing.

A bearing ring 16 is disposed beneath the sleeve 14 and has threaded engagement with the collar 8 to permit of convenient assembly and disassembly of the parts and to provide for the necessary adjustment to compensate for wear of the bearings. Anti-friction members 17 are interposed between the bearing ring 16 and the sleeve 14, and a locking nut 18 serves to hold the ring 16 against accidental turning. The segments 11 are yieldably maintained in radially expanded position by means of springs 19 and 20 which are set within recesses in the ends of the segments.

It will be seen that when an unscrewing motion is imparted to the collar 8, the sleeve 14 will be moved upwardly to permit the springs 19 and 20 to expand the segments 11, while when the collar 8 is screwed down, the tapering contacting surfaces of the sleeve 14 and the die segments will cause such segments to be forced inwardly.

In order to reduce the diameter of a ring, the die segments being in expanded position, a ring 21 may be placed in position whereupon the collar 8 is screwed down a sufficient number of turns to produce the desired contraction of the segments, and hence of the ring 21 contained in the mandrel. Reduction of the ring from the size indicated at point 22 to the size indicated at the step 23, for example, may be effected if the segments are moved from completely expanded position to fully contracted position, while if a smaller reduction of diameter is desired, the collar 8 will be given a fewer number of turns. Furthermore, a ring that is non-circular may be brought to circular form by contraction of the die segments.

It will be understood that the segments may be partially contracted at the time a ring is inserted therein and that such further contraction as may be desired can be had through further screwing down of the ring 8.

While I have shown the compressing die 10 as composed of sixteen segments 11, a greater or less number of segments may be employed, though I prefer to employ segments in such number that the spaces between such segments, when the segments are expanded, will be so narrow that metal from the ring will not be forced into such spaces during contraction of the die segments. The length of radial movement required of the segments is so slight that the clearance between the various segments, even when in expanded position, is very small and such clearance is of course reduced during contraction of the segments.

After a ring has been contracted, the collar 8 will be turned back to permit the segments to be expanded by the springs 19 and 20, whereupon the ring may be removed. If desired, liners 25 may be provided for the interior of the compressing die to bridge the spaces between segments and still further insure that metal will not be extruded from the ring into the spaces between the segments. These liners may be formed of celluloid or other flexible material.

By making the sleeve 14 of approximately the same length as the length of the die 10, or of somewhat greater length, the die segments are forced inwardly against the great resistance offered by a ring without danger of the segments being tilted, no matter whether the ring being operated upon is at a point near one end of the die or at a point intermediate the ends thereof.

It is important that anti-friction bearings be employed particularly at the point 15, since very great pressures are required in order to compress rings to reduced diameters.

The structure shown in Fig. 6 is identical with that shown in Fig. 1, except that I have incorporated therein means for preventing buckling of the ring 21 in directions axially thereof during contraction of the segments 11a by the sleeve 14a. This means comprises a screw plug 25a that may be entered into a tapped hole in the base 6a. With the ring 21 to be positioned as shown in Fig. 6, a washer or spacer 26 is dropped into place upon the shoulder 23 of the die segments. The ring 21 is then put in place and a screw 28 carrying a washer 27 is then screwed into the plug 25a.

The upper and lower sides of the ring are therefore confined between the washers 26 and 27 and thereby prevented from buckling or other axial distortion during contractive movement of the segments. For contracting rings of sizes other than that shown in Fig. 6, the washers 26 and 27 will be replaced by washers of other sizes to fit other sides of the die segments.

I claim as my invention:—

1. A ring contractor comprising a hollow die composed of radially movable segments, the interior of the die having annularly-formed seats of various diameters for supporting a ring thereon, means for drawing said segments together to contract a ring supported on one of said seats, and a plug member in said die and having means engaging the upper side of the ring for holding said ring on said seat during contraction thereof.

2. A contracting device for finger rings, comprising a base, a hollow die supported on said base, and being exteriorly tapered and composed of radially-movable segments, the interior of the die intermediate the ends thereof having stepped ring-supporting seats of various diameters, an interiorly-tapered sleeve surrounding said die and slidably movable axially thereof, to effect contraction of said segments through equal distances, a screw plug secured to said base and axially positioned interiorly of said die, and means carried by said plug in position directly above one of said seats, for clamping the sides of a ring therebetween.

3. A contracting device for finger rings, comprising a base, an exteriorly-tapered and hollow die supported on said base, said die being composed of radially movable segments, an interiorly tapered sleeve engaging said die from end-to-end, a collar in screw-threaded engagement with said base and operatively connected to said sleeve, whereby said sleeve is slidably moved axially of said die to effect contraction of said segments upon rotation of said collar, an annular groove in each end of said die, and an annular spring in each groove for urging said segments toward expanded position.

4. A ring contractor comprising a hollow die that is exteriorly tapered and which is composed of radially movable segments, a sleeve surrounding said die and movable axially thereof to effect contractive movements of said segments, the interior of the die having annularly-formed seats of various diameters, and a clamping member overlying one of said seats for supporting a ring therebetween, thereby to prevent axial distortion of the ring during contraction thereof.

In testimony whereof I, the said JOSEPH MAZER, have hereunto set my hand.

JOSEPH MAZER.